US008276822B2

(12) United States Patent
Kuroda

(10) Patent No.: US 8,276,822 B2
(45) Date of Patent: Oct. 2, 2012

(54) ELECTRONIC CIRCUIT

(75) Inventor: Tadahiro Kuroda, Kanagawa (JP)

(73) Assignee: Keio University, Tokyo (JP)

( * ) Notice: Subject to any disclaimer, the term of this patent is extended or adjusted under 35 U.S.C. 154(b) by 880 days.

(21) Appl. No.: 12/289,995

(22) Filed: Nov. 10, 2008

(65) Prior Publication Data

US 2009/0267848 A1 Oct. 29, 2009

(30) Foreign Application Priority Data

Apr. 28, 2008 (JP) ................................ 2008-117532

(51) Int. Cl.
*G06K 19/00* (2006.01)

(52) U.S. Cl. ......................... 235/487; 235/491; 235/492

(58) Field of Classification Search .................. 235/487, 235/491, 492
See application file for complete search history.

(56) References Cited

U.S. PATENT DOCUMENTS

| | | | |
|---|---|---|---|
| 5,701,037 A | 12/1997 | Weber et al. | |
| 2006/0176624 A1 | 8/2006 | Kuroda et al. | |
| 2006/0176676 A1 | 8/2006 | Kuroda et al. | |
| 2007/0274198 A1 | 11/2007 | Kuroda et al. | |
| 2007/0289772 A1 | 12/2007 | Kuroda et al. | |
| 2008/0258744 A1 | 10/2008 | Kuroda et al. | |
| 2009/0057039 A1 | 3/2009 | Kuroda et al. | |
| 2009/0065588 A1* | 3/2009 | Aoki et al. | 235/492 |

FOREIGN PATENT DOCUMENTS

| | | |
|---|---|---|
| JP | 2005-228981 A | 8/2005 |
| JP | 2005-348264 A | 12/2005 |
| JP | 2006-050354 A | 2/2006 |
| JP | 2006-066454 A | 3/2006 |
| JP | 2006-105630 A | 4/2006 |

OTHER PUBLICATIONS

D. Mizoguchi et al., "1.2Gb/s/pin Wireless Superconnect based on Inductive Inter-chip Signaling (IIS)," IEEE International Solid-State Circuits Conference, 2 sheets (Feb. 2004).
N. Miura et al., "Analysis and Design of Transceiver Circuit and Inductor Layout for Inductive Inter-chip Wireless Superconnect," Symposium on VLSI Circuits, Digest of Technical Papers, pp. 246-249, IEEE (Jun. 2004).
N. Miura et al., "Cross Talk Countermeasures in Inductive Inter-Chip Wireless Superconnect," in Proc. IEEE Custom Integrated Circuits Conference, pp. 99-102 (Oct. 2004).
N. Miura et al., "A 195Gb/s 1.2W 3D-Stacked Inductive Inter-Chip Wireless Superconnect with Transmit Power Control Scheme," IEEE International Solid-State Circuits Conference (ISSCC'05), Dig. Tech. Papers, pp. 264-265, Feb. 2005.

(Continued)

*Primary Examiner* — Karl D Frech
(74) *Attorney, Agent, or Firm* — Rader, Fishman & Grauer PLLC

(57) ABSTRACT

An electronic circuit, for which a coil 22 is disposed being overlapped with a region of a memory array 11, carries out communications by inductive coupling between stacked and mounted chips by means of the coil 22. Because each side of the coil 22 is disposed so as not to be parallel to a word line and a bit line 15, crosstalk between 'the coil 22' and 'the word line 14 and bit line 15' can minimized. This allows efficiently arranging a coil to carry out communications by inductive coupling between chips to be stacked and mounted.

12 Claims, 12 Drawing Sheets

OTHER PUBLICATIONS

N. Miura et al., "A 1Tb/s 3W Inductive-Coupling Transceiver for Inter-Chip Clock and Data Link," IEEE International Solid-State Circuits Conference (ISSCC'06), Dig. Tech. Papers, pp. 424-425, Feb. 2006.

N. Miura et al., "A 0.14pJ/b Inductive-Coupling Inter-Chip Data Transceiver with Digitally-Controlled Precise Pulse Shaping," IEEE International Solid-State Circuits Conference (ISSCC'07), Dig. Tech. Papers, pp. 264-265, Feb. 2007.

* cited by examiner

ELECTRONIC CIRCUIT

BACKGROUND OF THE INVENTION

1. Field of the Invention

The present invention relates to an electronic circuit that is capable of suitably carrying out communications between chips such as IC (Integrated Circuit) bare chips to be stacked and mounted.

2. Description of the Related Arts

The present inventors have proposed electronic circuits that carry out communications by inductive coupling between chips to be stacked and mounted via coils formed by on-chip wiring of LSI (Large Scale Integration) chips (refer to Patent Documents 1 to 7 and Non-Patent Documents 1 to 3).

[Patent Document 1] US 20070289772 A1

[Patent Document 2] JP 2005-348264 A

[Patent Document 3] JP 2006-050354 A

[Patent Document 4] US 20070274198 A1

[Patent Document 5] JP 2006-105630 A

[Patent Document 6] US 20060176676 A1

[Patent Document 7] US 20060176624 A1

[Non-Patent Document 1] D. Mizoguchi et al., "A 1.2 Gb/s/pin Wireless Superconnect based on Inductive Inter-chip Signaling (IIS)," IEEE International Solid-State Circuits Conference (ISSCC '04), Dig. Tech. Papers, pp. 142-143, 517, February 2004.

[Non-Patent Document 2] N. Miura et al., "Analysis and Design of Transceiver Circuit and Inductor Layout for Inductive Inter-chip Wireless Superconnect," Symposium on VLSI Circuits, Dig. Tech. Papers, pp. 246-249, June 2004.

[Non-Patent Document 3] N. Miura et al., "Cross Talk Countermeasures in Inductive Inter-Chip Wireless Superconnect," in Proc. IEEE Custom Integrated Circuits Conference (CICC '04), pp. 99-102, October 2004.

SUMMARY OF THE INVENTION

However, independently securing an area to form a coil by on-chip wiring results in a large-sized chip, and downsizing a coil to minimize a chip results in a short communication distance, which disables communications with a distant chip.

Therefore, it can be considered to dispose a coil in an overlapped manner with another circuit. When a memory is integrated in a chip, there is mainly a region where a memory array to store information exists and a region of a peripheral circuit to read out information stored in the memory array (and/or to write information to be stored in the memory array) Of these, in the peripheral circuit, all the metal wiring is generally used and there is no excess in metal wiring, and thus to dispose a coil in an overlapped manner with the peripheral circuit region, it becomes necessary to provide exclusive metal wiring for the coil, which is not realistic. Moreover, in the memory array region, only two layers of metal wiring corresponding to bit lines and word lines are generally used and a rarely used metal wiring layer exists. However, these bit lines and word lines to be used for writing/reading out information have been integrated at a high density, and there is reluctance in terms of conventional common sense in further laying thereon wiring for a different purpose as this is considered to spoil the reliability of the memory. Therefore, conventionally in the memory array region, only two layers of metal wiring corresponding to bit lines and word lines have been used, and a rarely used metal wiring layer has existed.

In view of the above-described problems, it is therefore an object of the present invention to provide an electronic circuit for which a substrate having a memory array is efficiently disposed with an antenna for carrying out wireless communications.

An electronic circuit according to a first aspect of the present invention includes, on a semiconductor substrate, a memory array for storing information, and an antenna formed by a metal wiring layer being overlapped with a region where the memory array exists.

Moreover, an electronic circuit according to a second aspect of the present invention comprises: a first semiconductor substrate including a first memory array for storing information, and a first antenna formed by a metal wiring layer being overlapped with a region where the first memory array exists; and a second semiconductor substrate including a second memory array for storing information, and a second antenna formed by a metal wiring layer being overlapped with a region where the second memory array exists; wherein the first semiconductor substrate and the second semiconductor substrate are stacked and mounted so that a region, on the first semiconductor substrate, where the first antenna exists and a region, on the second semiconductor substrate, where the second antenna exists are overlapped and the first and second antennas carry out wireless communications with each other.

Moreover, an electronic circuit according to a third aspect of the present invention comprises: a first semiconductor substrate including a memory array for storing information and a first antenna formed by a metal wiring layer being overlapped with a region where the memory array exists; and a third semiconductor substrate including a third antenna formed by a metal wiring layer being overlapped with a region where the first antenna exists.

Moreover, an electronic circuit according to a fourth aspect of the present invention, the antenna is a coil wired on the semiconductor substrate.

Moreover, an electronic circuit according to a fifth aspect of the present invention includes: a transmitter connected to the coil and disposed outside a region where the memory array exists; and a routing wiring connecting the coil and the transmitter and disposed so as not to be parallel to a bit line and/or a word line of the memory array.

Moreover, in an electronic circuit according to a sixth aspect of the present invention, the coil is wound multiple times so as not to be overlapped, including the routing wiring, in a region where the memory array exists.

Moreover, in an electronic circuit according to a seventh aspect of the present invention, the coil has a polygonal shape, each side of which is disposed so as not to be parallel to a bit line and/or a word line of the memory array.

Moreover, an electronic circuit according to a eighth aspect of the present invention includes a transmitter connected to the coil, and including a potential holding circuit that attempts to hold the coil at a predetermined potential; and a coil driver circuit that drives the coil in accordance with transmission data while holding a potential in a center of the coil at the predetermined potential.

Moreover, an electronic circuit according to an ninth aspect of the present invention carries out wireless communications with another electronic circuit by the antenna.

According to the present invention, a channel for inductive coupling communications can be installed on the memory array without increasing the chip size (and therefore without increasing the manufacturing cost.)

Because there is a large area on the memory array, a large coil can be installed, which allows communications over long distances. A communication distance is almost equal to the diameter of the coil. Moreover, the larger the diameter, the more the coil becomes tolerant of an alignment error when chips are stacked up. It also becomes possible to mutually misalign chips to be stacked up, by intention, for securing a region for bonding wiring.

In the case of a memory mixed in a logic integrated circuit, because there are a plurality of unused metal wiring layers on the memory array, the coil size can be reduced by increasing the number of times of winding.

Moreover, because the memory array often occupies a large area of the chip size, a large number of channels can be formed in parallel, which allows increasing the communications band.

The disclosure of Japanese Patent Application No. 2008-117532, filed Apr. 28, 2008 including its specification, claims and drawings, is incorporated herein by reference in its entirety.

DETAILED DESCRIPTION OF THE INVENTION

Hereinafter, a detailed description is given of preferred embodiments of the present invention with reference to the accompanying drawings.

Embodiment 1

Figure 1:
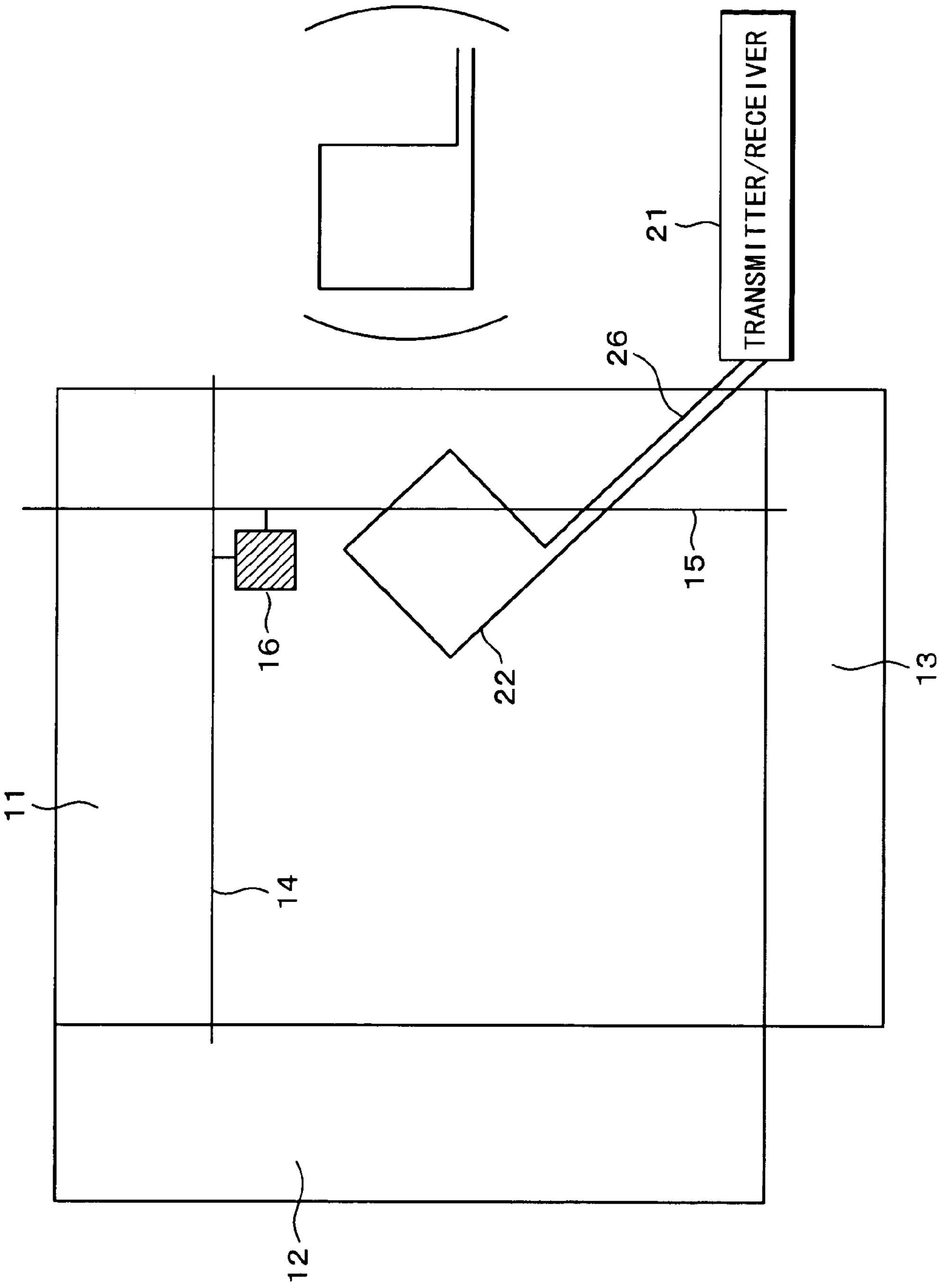
FIG. 1 is a view depicting a configuration of an electronic circuit according to Embodiment 1 of the present invention.

FIG. 1 is a view depicting a configuration of an electronic circuit according to Embodiment 1 of the present invention. The figure depicts one LSI chip in an electronic circuit to be stacked and mounted. The LSI chip is composed of a memory array 11, a peripheral circuit 12 being, for example, a decoder, and a peripheral circuit 13 being, for example, a sense amplifier. In the memory array 11, many word lines 14 and bit lines 15 are disposed at a high density, and memory cells 16 are disposed at intersections thereof. The word lines 14 select memory cell lines, and the bit lines 15 write or read out signals. The figure depicts one each of the word lines 14, the bit lines 15, and the memory cells 16. In a region of the memory array 11, a coil 22 connected to a transmitter/receiver 21 and for carrying out communications by inductive coupling is disposed. The coil 22 is formed by a metal wiring layer different from that for the word lines 14 and the bit lines 15. At that time, the shape of the coil 22 is provided as a polygonal shape, here, for example, a square shape, and each side thereof is disposed so as not to be parallel to the word line 14 and the bit line 15. Although an example where each side of a coil conversely becomes parallel to the word line 14 or the bit line 15 is shown in parentheses of the figure, influence thereof can be minimized even in this case by an embodiment to be described later.

Further, in the present embodiment, a routing wiring 26 that connects the transmitter/receiver 21 and the coil 22 is disposed so as not to be parallel to the word line 14 and the bit line 15. These allow minimizing capacitive coupling and magnetic field coupling between 'the coil 22 and routing wiring 26' and 'the word line 14 and bit line 15'.

Figure 2A:
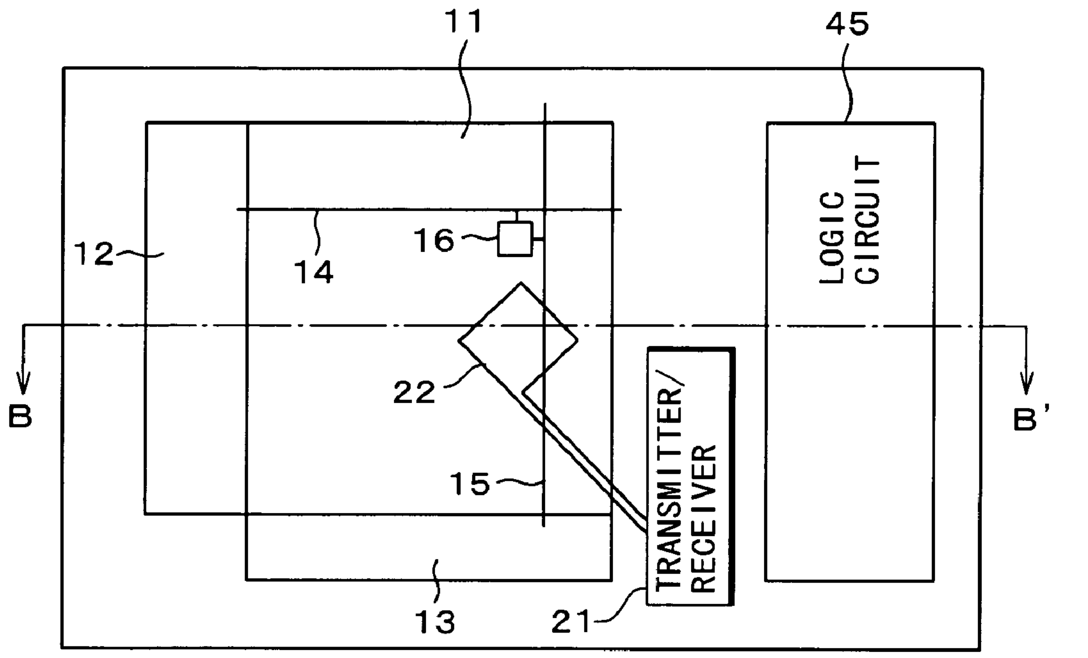
FIG. 2A and FIG. 2B are views depicting a mounting example of the electronic circuit according to Embodiment 1 of the present invention.
Figure 2B:
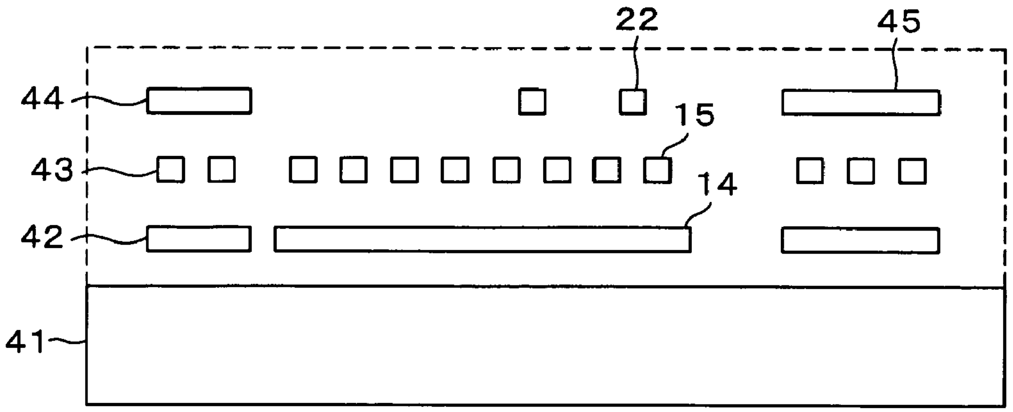

FIG. 2A and FIG. 2B are views depicting a mounting example of the electronic circuit according to Embodiment 1 of the present invention. FIG. 2A is the same plan view as with FIG. 1, and FIG. 2B is a sectional view along a line B-B' of FIG. 2A. The figure depicts a standard LSI chip having the memory array 11 and a logic circuit 45, for which three metal wiring layers 42 to 44 are stacked upon a semiconductor substrate 41. The metal wiring layer 42 of a first layer forms the word line 14, the metal wiring layer 43 of a second layer forms the bit line 15, and the metal wiring layer 44 of a third layer forms the coil 22. Although three or more metal wiring layers are used for the peripheral circuit 12, 13 and the logic circuit 45, only two layers are mostly used for the memory array 11, and thus an unused metal wiring layer in a region thereof is used to form the coil 22. However, what and in which metal wiring layer to form can be arbitrarily selected and are thus not limited to this example.

Embodiment 2

Figure 3:
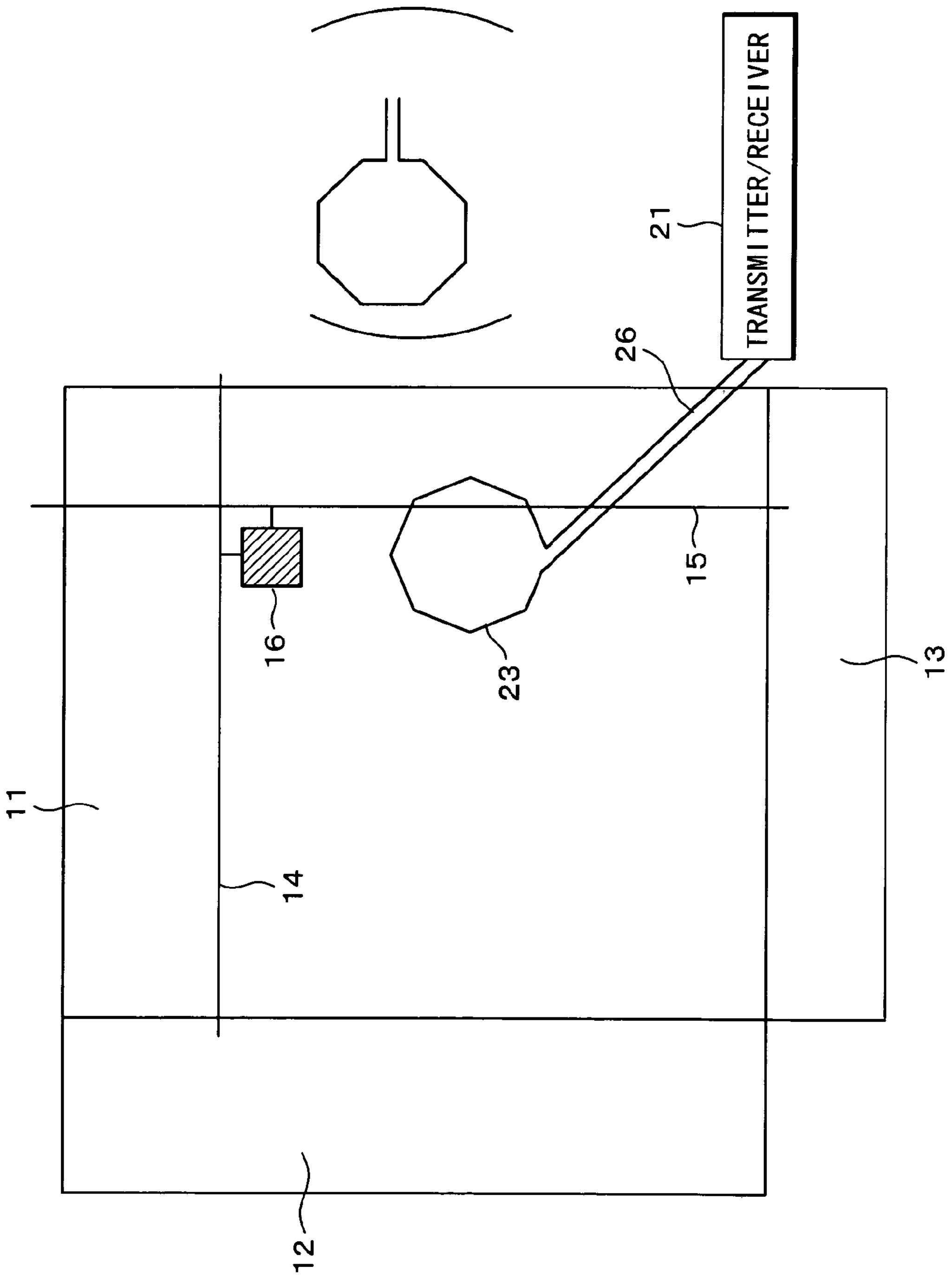
FIG. 3 is a view depicting a configuration of an electronic circuit according to Embodiment 2 of the present invention.

FIG. 3 is a view depicting a configuration of an electronic circuit according to Embodiment 2 of the present invention. For the present embodiment, the shape of a coil 23 is provided as an octagonal shape. In the present embodiment as well, each side of the coil 23 is disposed so as not to be parallel to a word line 14 and a bit line 15, and a routing wiring 26 that connects a transmitter/receiver 21 and the coil 23 is disposed so as not to be parallel to the word line 14 and the bit line 15. The coil shape may be another arbitrary polygonal shape. Although an example where any side of a coil conversely becomes parallel to the word line 14 or the bit line 15 is shown in parentheses of the figure, influence thereof can be minimized even in this case by an embodiment to be described later.

Figure 4A:
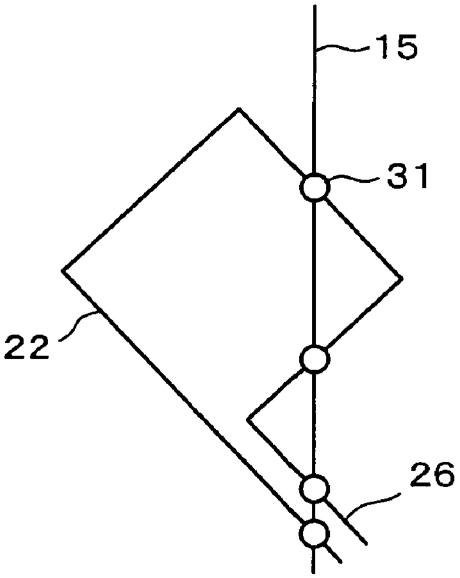
FIG. 4A and FIG. 4B are views depicting operation of Embodiment 1 of the present invention.
Figure 4B:
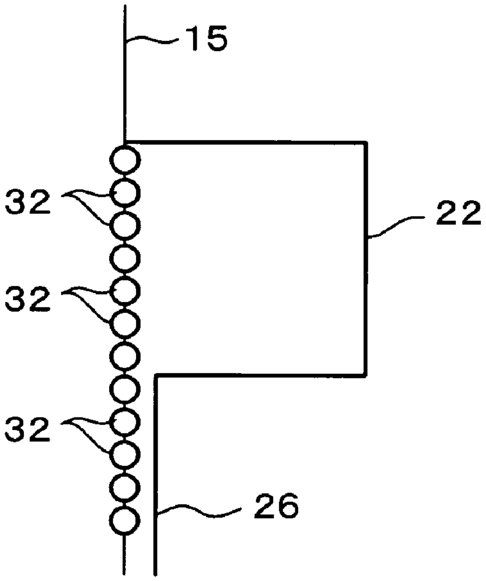

FIG. 4A and FIG. 4B are views depicting operation of Embodiment 1 of the present invention. FIG. 4A depicts a case of Embodiment 1, and FIG. 4B depicts a case where the present embodiment is not applied. When an overlapping part 31 between 'the coil 22 and routing wiring 26' and 'the bit line 15' in the case of Embodiment 1 shown in FIG. 4A is compared with an overlapping part 32 between 'the coil 22 and routing wiring 26' and 'the bit line 15' in the case shown in FIG. 4B where Embodiment 1 is not applied, it can be understood that the overlapping part 31 is markedly smaller than the overlapping part 32. Therefore, a coupling capacitance with 'the coil 22 and the routing wiring 26' is sufficiently smaller than the capacitance of the bit line 15. Further, a potential variation of the bit line 15 due to a potential variation of 'the coil 22 and the routing wiring 26' is sufficiently small. The same applies to the word line 14.

Embodiment 3

Figure 5:
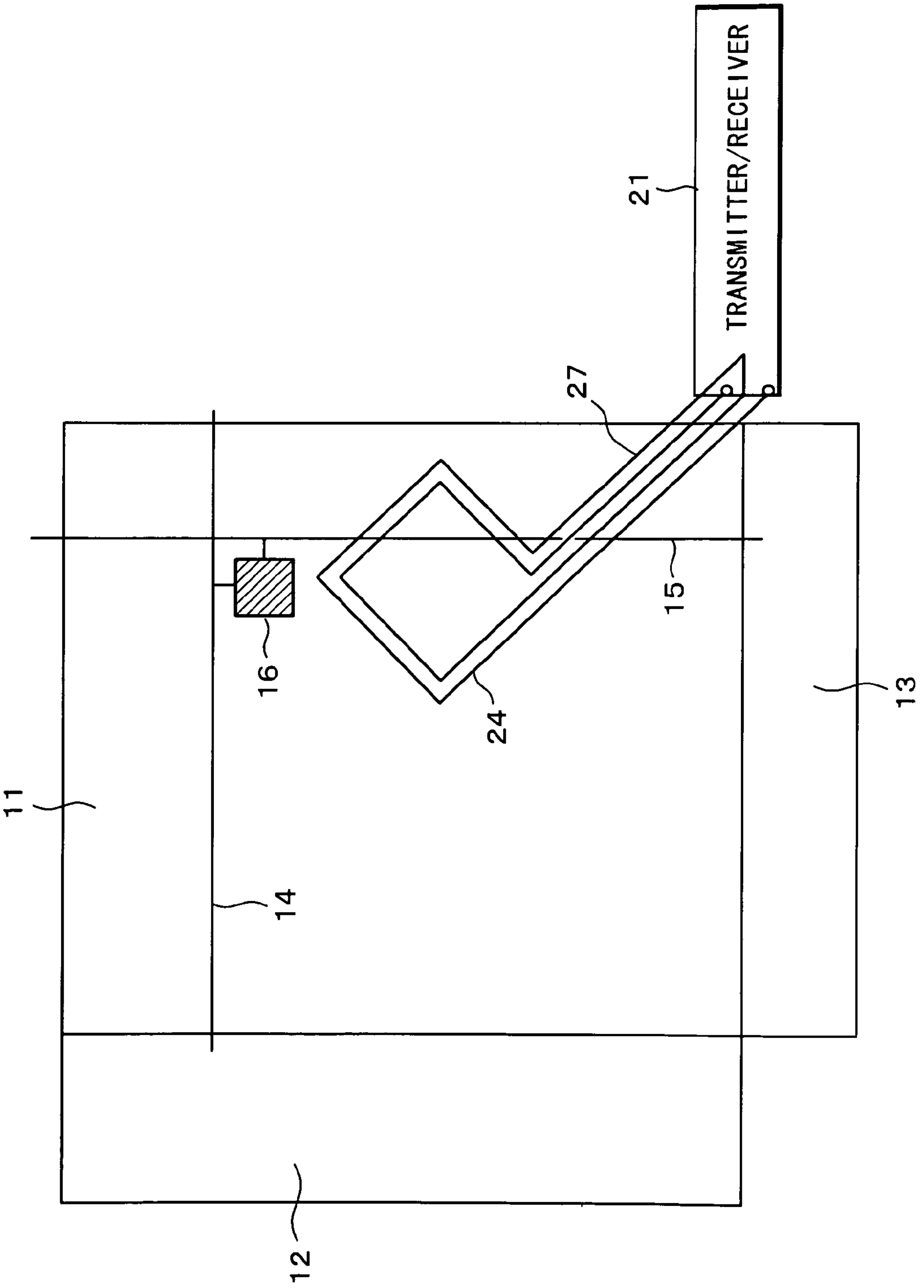
FIG. 5 is a view depicting a configuration of an electronic circuit according to Embodiment 3 of the present invention.
Figure 6:
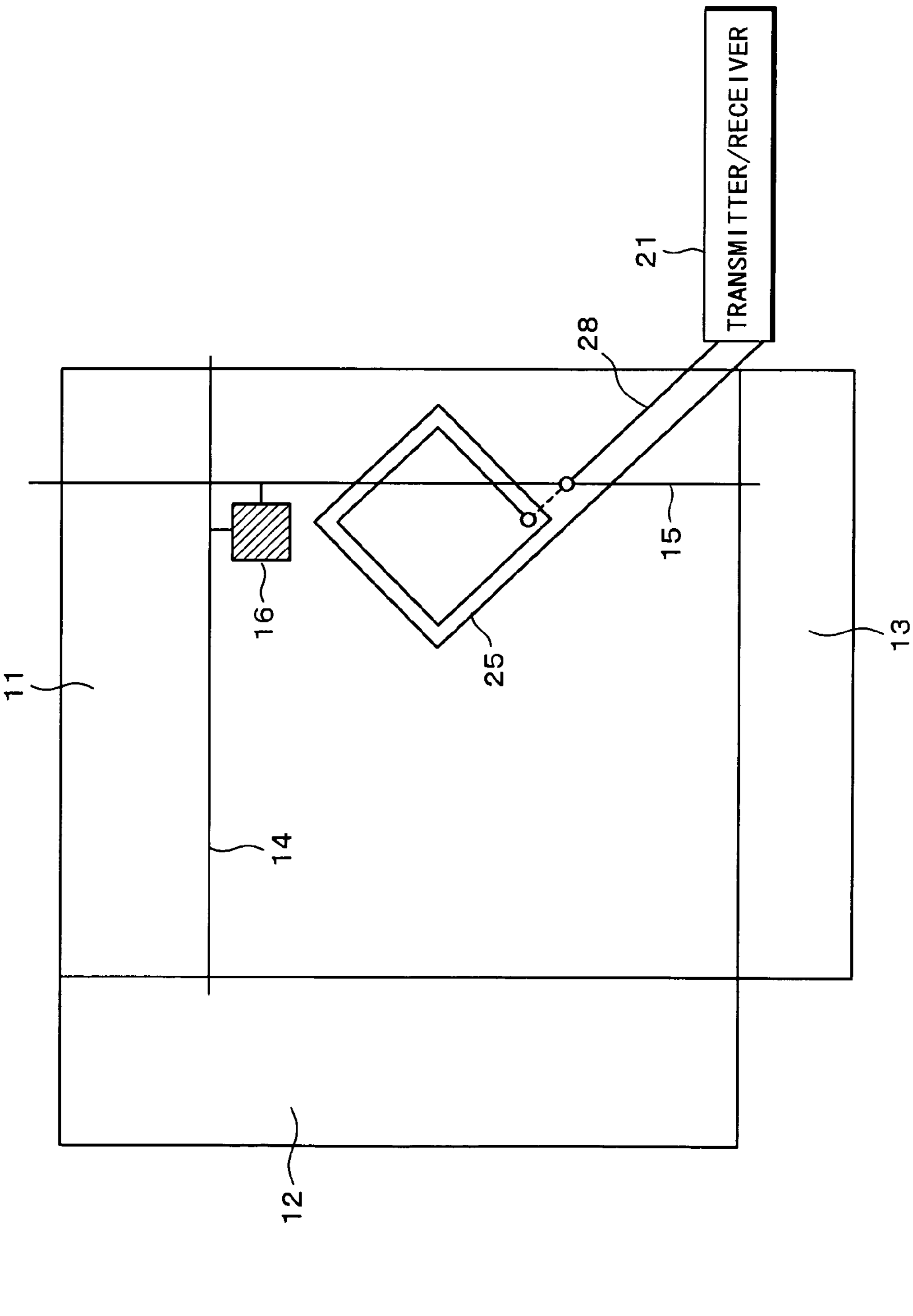
FIG. 6 is a view depicting a configuration of an electronic circuit when Embodiment 3 is not applied thereto.

FIG. 5 is a view depicting a configuration of an electronic circuit according to Embodiment 3 of the present invention. FIG. 6 is a view depicting a configuration of an electronic circuit when the present embodiment is not applied thereto. When a coil 24 is wound multiple times, for example, two times, normal winding requires, as shown in FIG. 6, two metal wiring layers and a VIA (interlayer connection line) on a memory array 11. On the other hand, as shown in FIG. 5, when carrying out such a layout as to route the wiring to a transmitter/receiver 21 for every one time the coil is wound, it suffices to use a single metal wiring layer on a memory array 11. This allows forming a coil wound multiple times from a single metal wiring layer.

Embodiment 4

Figure 7:
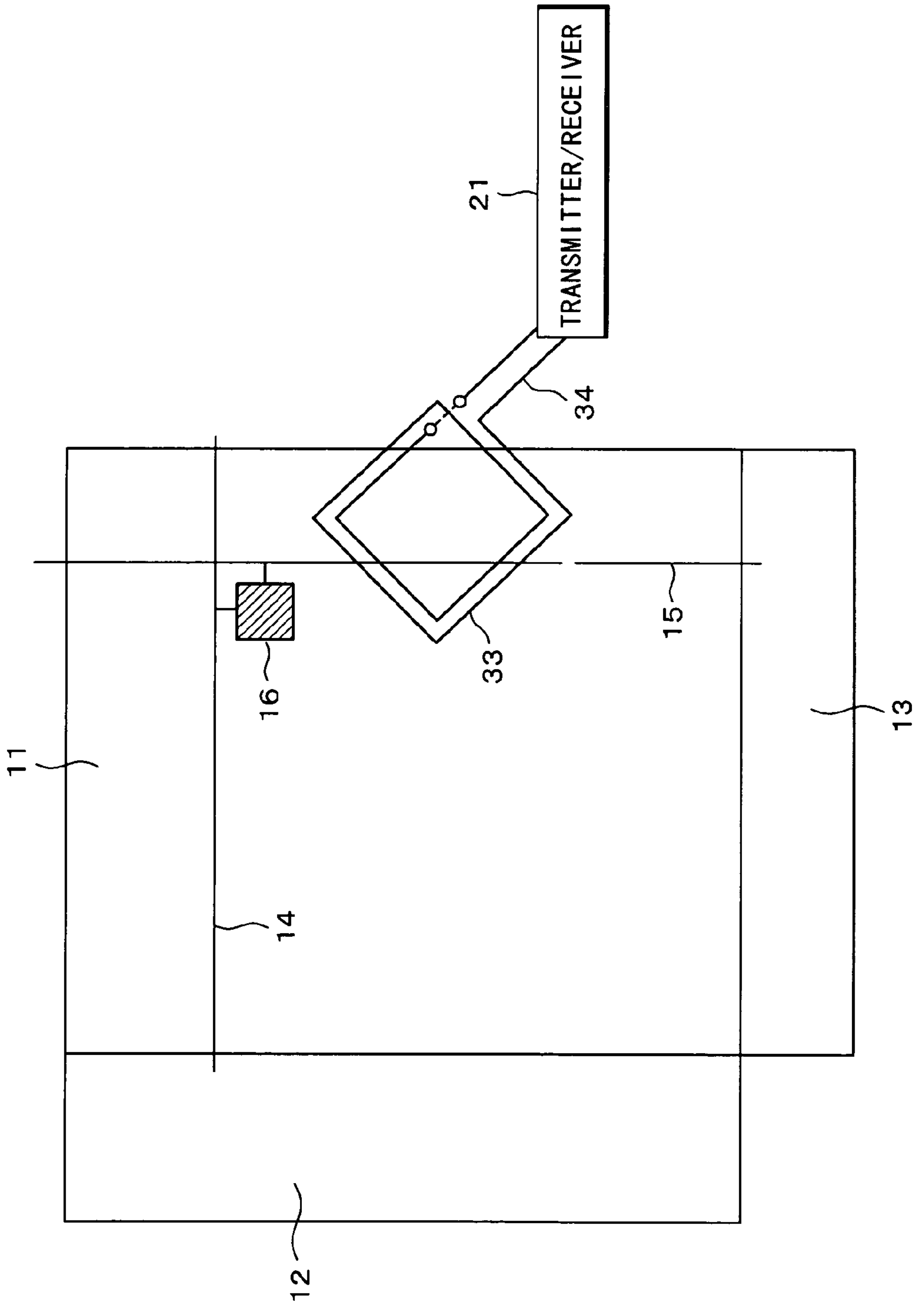
FIG. 7 is a view depicting a configuration of an electronic circuit according to Embodiment 4 of the present invention.

FIG. 7 is a view depicting a configuration of an electronic circuit according to Embodiment 4 of the present invention. For the present embodiment, a coil 33 is partially extended outside a memory array 11, and there the coil is wound multiple times by means of a VIA. In the present embodiment as well, it suffices to use a single metal wiring layer on the memory array 11, and allows forming a coil wound multiple times from a single metal wiring layer.

Increasing the number of times of winding of a coil allows increasing self-inductance of the coil, thus resulting in a large receiving signal. As a result, the communication distance can be extended, and reliability of communications can be improved.

Figure 8A:
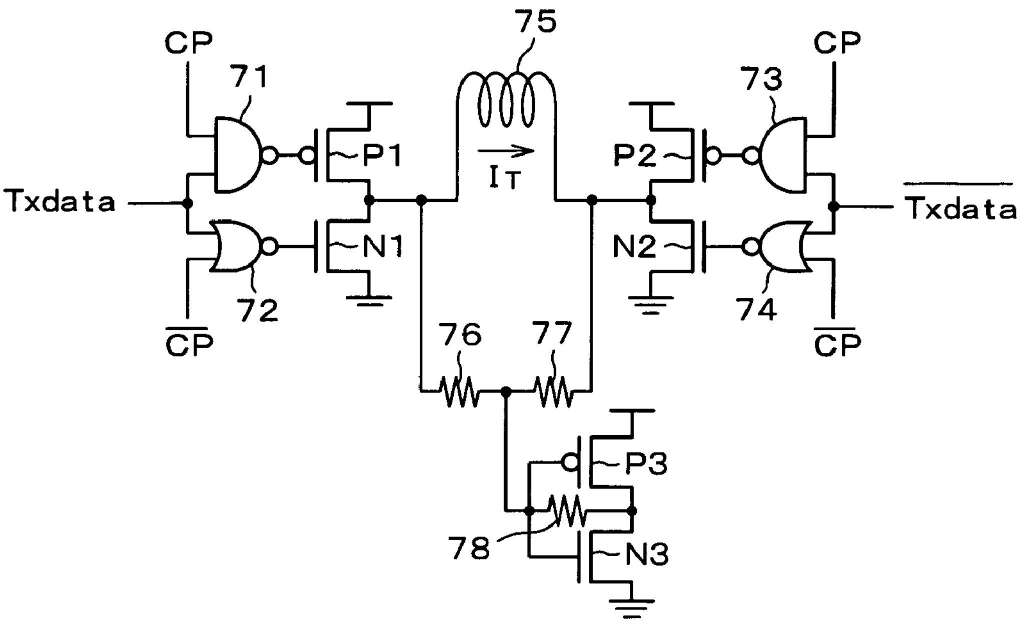
FIG. 8A, FIG. 8B, and FIG. 8C are diagrams depicting a configuration and waveforms of a transmitter according to Embodiment 1 of the present invention.
Figure 8B:
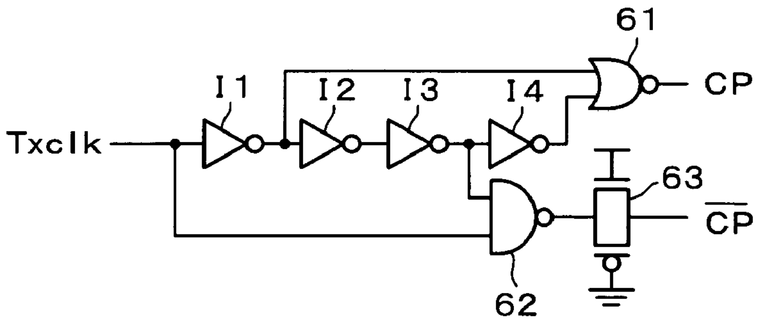
Figure 8C:
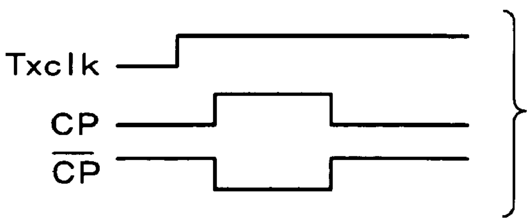
Figure 9A:
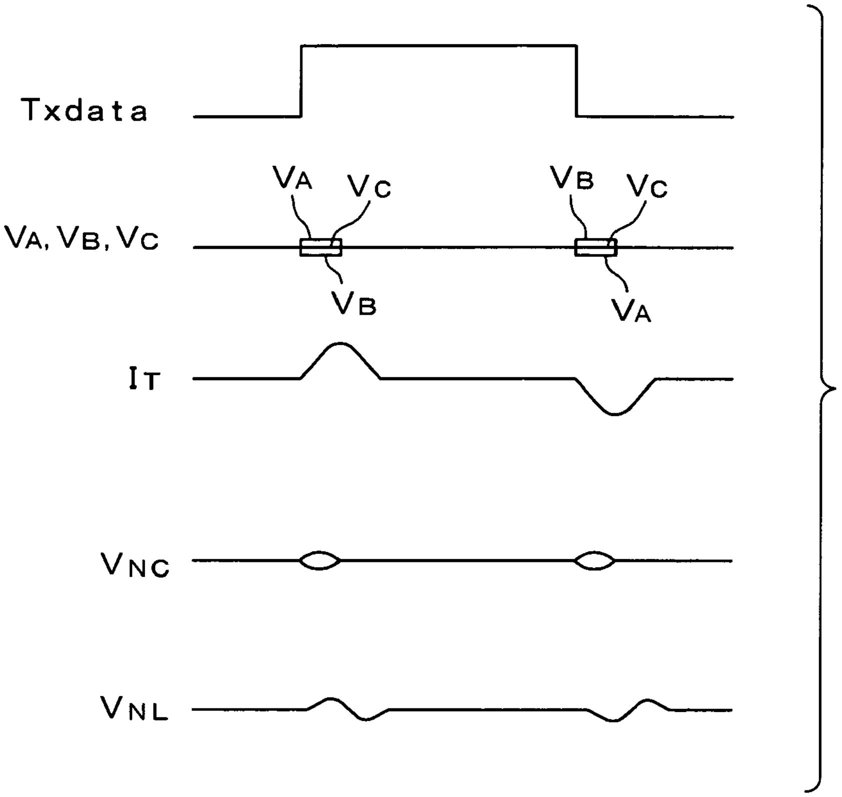
FIG. 9A and FIG. 9B are diagrams depicting waveforms of respective portions of the transmitter according to Embodiment 1 of the present invention.
Figure 9B:
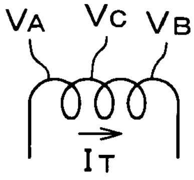
Figure 10:
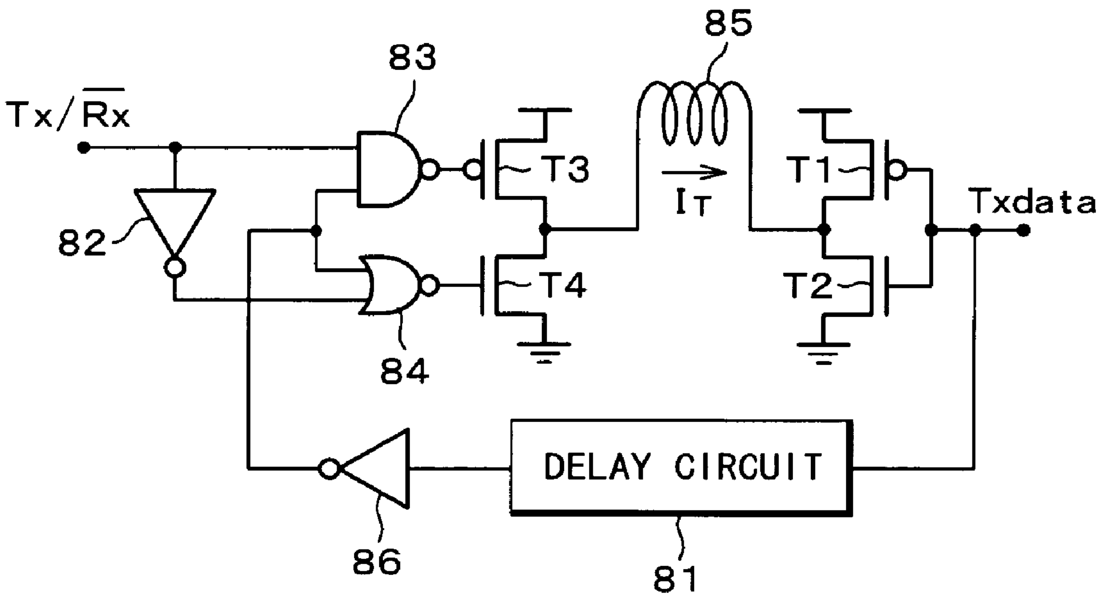
FIG. 10 Prior Art
FIG. 10 is a view depicting a configuration of a conventional transmitter.
Figure 11A:
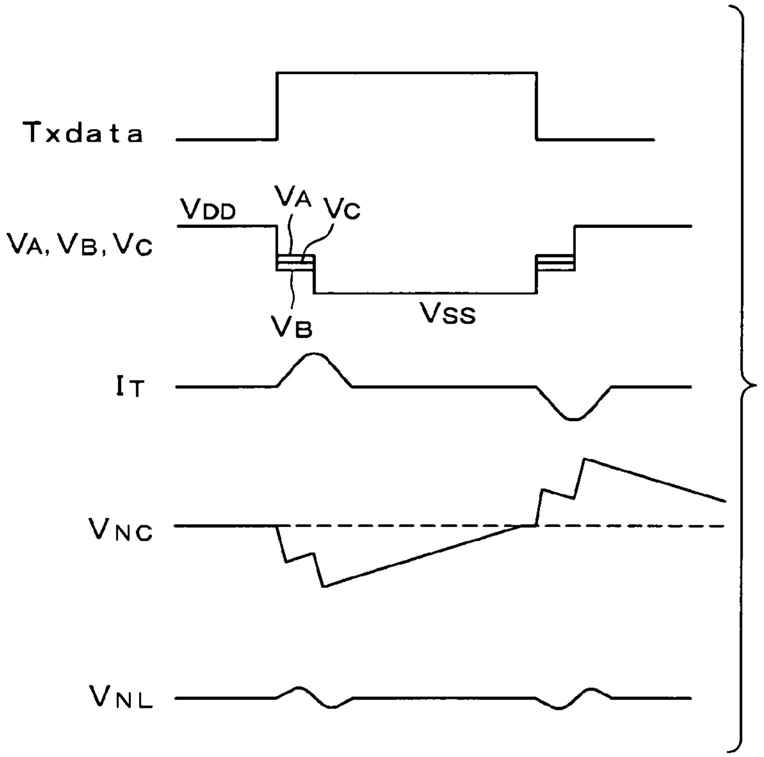
FIG. 11A Prior Art
FIG. 11A and FIG. 11B are views depicting waveforms of respective portions of the conventional transmitter.
Figure 11B:
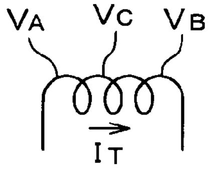
FIG. 11B Prior Art

FIG. 8A, FIG. 8B, and FIG. 8C are diagrams depicting a configuration and waveforms of a transmitter according to Embodiment 1 of the present invention. FIG. 9A and FIG. 9B are diagrams depicting waveforms of respective portions of the transmitter according to Embodiment 1 of the present invention. FIG. 10 is a view depicting a configuration of a conventional transmitter. FIG. 11A and FIG. 11B are views depicting waveforms of respective portions of the conventional transmitter. The conventional transmitter shown in FIG. 10 is composed of a delay circuit 81, an inverter 82, a NAND 83, a NOR 84, an inverter 86, and transistors T1 to T4, and the transistor T1 and the transistor T2, and the transistor T3 and the transistor T4 form inverters, respectively, and function as a buffer to drive a transmitter coil 85.

When transmitting a signal, a signal Tx/$\overline{\text{Rx}}$ becomes high. As a result, the NAND 83 and the NOR 84 are both to perform an operation the same as that of an inverter, so that a signal of transmission data Txdata is to enter the transistor T3 and the transistor T4 as a signal of the same polarity after an elapse of certain time after entering the transistors T1 and T2. For example, supposing first that the transmission data Txdata is low, because the transistor T1 and the transistor T3 are on, potential of a transmitter coil 85 is a power supply potential VDD, and a current IT that flows to the transmitter coil 85 is 0. Next, when the transmission data Txdata has changed from low to high, the transistor T1 is first turned off, and the transistor T2 is simultaneously turned on. At this time, similar to before, the transistor T3 remains on, and the transistor T4 remains off. Accordingly, a current IT flows to the transmitter coil 85 in the positive direction. At this time, the potential at respective portions of the transmitter coil 85 changes to VA, VB, and VC, which are intermediate potentials between VDD and VSS (GND) determined by a ratio of on-resistance between the transistor T3 and the transistor T2. In actuality, these potentials VA, VB, and VC are almost equal. This change in transmission data Txdata from low to high propagates to the transistors T3 and T4 via the delay circuit 81, the inverter 86, the NAND 83, and the NOR 84, so that the transistor T3 is turned off and the transistor T4 is turned on. As a result, the current IT that flows to the transmitter coil 85 becomes zero. At this time, the potential of the transmitter coil 85 becomes VSS. Also, when the transmission data Txdata has changed from high to low, a circuit operation the same as that in the above description and with an opposite polarity is performed. The variation in potential of the transmitter coil 85 greatly influences bit lines 15 etc., as a noise VNC resulting from capacitive coupling. In this connection, shortening the time for which a current flows through the transmitter coil 85 allows suppressing a noise VNL resulting from inductive coupling to be exerted to the bit lines 15 etc., to a necessary minimum. As described above, in the conventional circuit, when transmitting a signal, potential of the transmitter coil greatly varies, and thus there has been a concern about influence of capacitive coupling or the like with the bit lines and word lines of the memory array.

On the other hand, the transmitter according to Embodiment 1 shown in FIG. 8A and FIG. 8B is composed of NANDs 71 and 73, NORs 72 and 74, resistors 76, 77, and 78, and transistors P1 to P3 and N1 to N3. The NANDs 71 and 73, the NORs 72 and 74, and the transistors P1, P2, N1, and N2 are a coil driver circuit to drive a transmitter coil 75, and the resistors 76, 77, and 78 and the transistors P3 and N3 are a potential holding circuit that attempts to hold the transistor coil 75 at an intermediate potential between VDD and VSS determined by a ratio of on-resistance between the transistor P3 and the transistor N3. A signal CP is prepared from a clock Txclk by a circuit shown in FIG. 8B, and a waveform thereof is shown in FIG. 8C. The circuit shown in FIG. 8B is composed of a NOR 61, a NAND 62, a buffer 63, and inverters I1 to I4. When the signal CP is low, the transistors P1 to P3 and N1 to N3 are off regardless of transmission data Txdata, current does not flow to the transmitter coil 75, and the transmitter coil 75 is held at a predetermined potential by the potential holding circuit. When the signal CP synchronous with the clock Txclk is high, current flows to the transmitter coil 75 in accordance with the transmission data Txdata. When the transmission data Txdata is high, the transistors P1 and N2 are on, the transistors P2 and N1 are off, a current IT flows to the transmitter coil 75, and at this time, the potential at respective portions of the transmitter coil 75 becomes VA, VB, and VC, which are intermediate potentials between VDD and VSS determined by a ratio of on-resistance between the transistor P1 and the transistor N2. In actuality, these potentials VA, VB, and VC are almost equal. In addition, when the transmission data Txdata is low, the transistors P2 and N1 are on, the transistors P1 and N2 are off, a current –IT flows to the transmitter coil 75, and potential of the transmitter coil 75 becomes VA, VB, and VC, which are intermediate potentials between VDD and VSS determined by a ratio of on-resistance between the transistor P2 and the transistor N1. Accordingly, when the size of each transistor is designed so that the ratio of on-resistance between the transistors P1 and N2, the ratio of on-resistance between the transistors P2 and N1, and the ratio of on-resistance between the transistors P3 and N3 become equal, a potential to be output by the potential holding circuit and a potential the transmitter drives the transmitter coil 75 when the transmission data Txdata changes and the signal CP becomes high become almost equal, so that potential of the transmitter coil 75 becomes always almost constant. In actuality, under the influence of production tolerance, a slight change in potential can occur. However, the period of time where the signal CP is high is very short, for example, on the order of 300 picoseconds. On the other hand, the writing/reading-out speed of a memory is, for example, on the order of 3 nanoseconds/bit to 3 microseconds/bit. By thus setting the time to drive the transmitter coil sufficiently shorter than the time where signals of the bit lines and word lines of the memory array change, even when potential of the transmitter coil changes in the short period of time where the signal CP is high, influence to be exerted to writing/reading-out of the memory can be reduced. In addition, because the potential holding circuit attempts to hold the transmitter coil 75 at a predetermined potential, potential of the transmitter coil 75 does not greatly change even when current flows to the transmitter coil 75, and thus from this viewpoint as well, influence to be exerted to writing/reading-out of the memory is small.

With regard to output of the potential holding circuit, the same effects can be obtained even when this is connected to a center of the transmitter coil 75 via a resistor.

The present invention is not limited to the above-described embodiments.

Figure 12A:
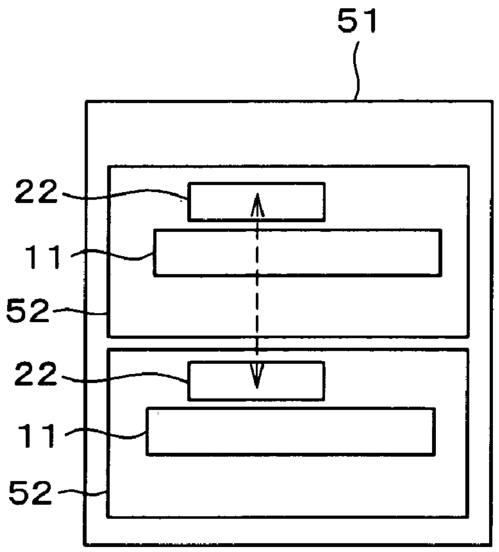
FIG. 12A, FIG. 12B, FIG. 12C, and FIG. 12D are views depicting application examples of the present invention.
Figure 12B:
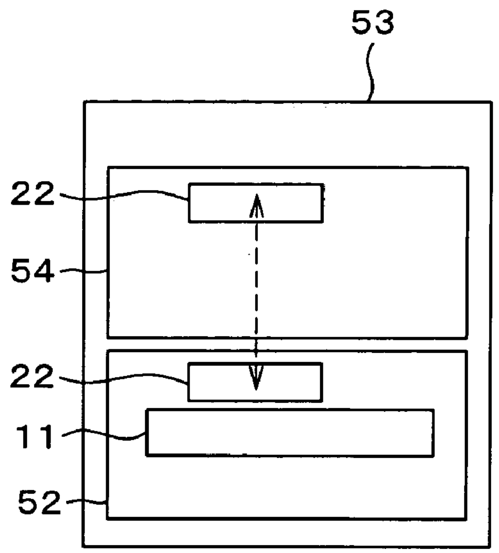
Figure 12C:
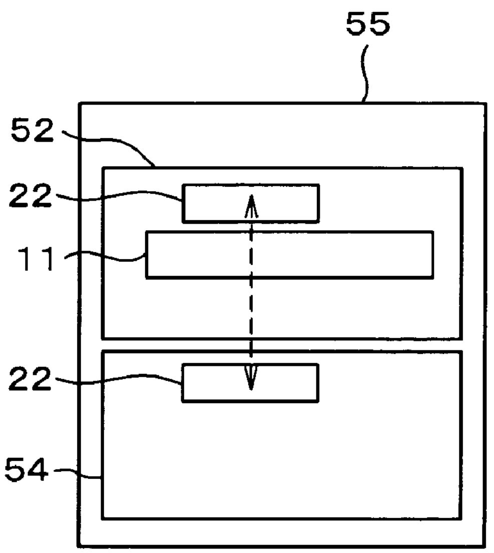
Figure 12D:
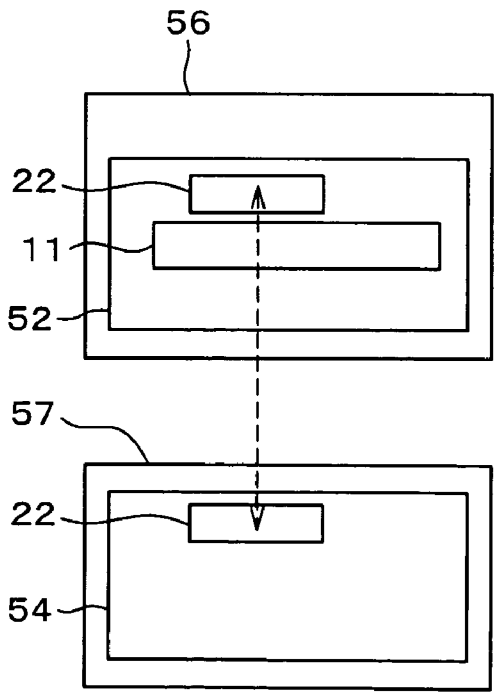

FIG. 12A, FIG. 12B, FIG. 12C, and FIG. 12D are views depicting application examples of the present invention. FIG. 12A depicts the most typical application example, which is an example of an LSI 51 for which a plurality of chips 52 each having a memory array 11 and a coil 22 are stacked and mounted. Here, the figure depicts a schematic illustration, and in actuality, other chips may be stacked and mounted. FIG. 12B depicts an example of an LSI 53 for which a chip 54 having a coil 22 is stacked and mounted on a chip 52 having a memory array 11 and a coil 22. FIG. 12C, on the other hand, depicts an example of an LSI 55 for which a chip 52 having a memory array 11 and a coil 22 is stacked and mounted on a chip 54 having a coil 22. FIG. 12D depicts an example of a combination of an LSI 56 having a memory array 11 and a coil 22 and an LSI 57 having a coil 22, where the LSIs mutually carry out communications by inductive coupling.

Although in the above-described embodiments, examples where the coil as a whole is formed being overlapped with the memory array region have been shown, there may be cases where the coil is partially overlapped with the memory array region.

Providing the coil with a large opening allows carrying out communications even when there is a slight misalignment in the stacking position between chips and coil openings are therefore mutually slightly misaligned in the stacking position.

The memory may be a read-only memory, or may be a writable memory.

As an antenna, an antenna in another shape such as a rod shape may be used in place of the coil, or a capacitor electrode that carries out communications by capacitive coupling may be used.

The antenna may not only be used for communications in the present electronic circuit, but also be used for communications with another electronic circuit.

The transmitter/receiver may be a transmitter or a receiver. More specifically, there can be cases where the coil is connected to a transmitter/receiver and shared for transmission and reception, the coil is connected to a transmitter and used as a transmitter coil, and the coil is connected to a receiver and used as a receiver coil, and any of these are within the scope of the present invention. In this respect, although a transmitter has been typically described in the claims, the transmitter includes the case of being a receiver or a transmitter/receiver. Likewise, the antenna and coil described in the claims also include any of the cases being for transmission, for reception, and for transmission and reception.

All the publications, patents and patent applications cited in the present specification are taken in the present specification as references.

What is claimed is:

1. An electronic circuit comprising:

a semiconductor substrate including, on the semiconductor substrate, a memory array for storing information, and a coil as an antenna formed by a metal wiring layer being overlapped with a region where the memory array exists;

a transmitter connected to said coil and disposed outside a region where said memory array exists; and a routing wiring connecting said coil and said transmitter and disposed so as not to be parallel to a line from the group consisting of a bit line and a word line of said memory array.

2. The electronic circuit according to claim 1, wherein said coil is wound multiple times so as not to be overlapped, including said routing wiring, in a region where said memory array exists.

3. An electronic circuit including, on a semiconductor substrate:

a memory array for storing information; and a coil as an antenna formed by a metal wiring layer being overlapped with a region where the memory array exists, wherein said coil has a polygonal shape, each side of which is disposed so as not to be parallel to a line from the group consisting of a bit line and a word line of said memory array.

4. An electronic circuit including, on a semiconductor substrate:

a memory array for storing information; and a coil as an antenna formed by a metal wiring layer being overlapped with a region where the memory array exists;

a transmitter connected to said coil;

a potential holding circuit that attempts to hold the coil at a predetermined potential; and a coil driver circuit that drives the coil in accordance with transmission data while holding a potential in a center of the coil at the predetermined potential.

5. An electronic circuit comprising:

a first semiconductor substrate including a first memory array for storing information, and a first coil as an antenna formed by a metal wiring layer being overlapped with a region where the first memory array exists;

a second semiconductor substrate including a second memory array for storing information, and a second coil as an antenna formed by a metal wiring layer being overlapped with a region where the second memory array exists;

first and second transmitters connected to said first and second coils and disposed outside regions where said first and second memory arrays exist; and first and second routing wirings connecting said first and second coils and said first and second transmitters and disposed so as not to be parallel to a line from the group consisting of a bit line and a word line of said first and second memory arrays;

wherein the first semiconductor substrate and the second semiconductor substrate are stacked and mounted so that a region, on the first semiconductor substrate, where the first coil exists and a region, on the second semiconductor substrate, where the second coil exists are overlapped and the first and second coils carry out wireless communications with each other.

6. The electronic circuit according to claim 5, wherein a coil from the group consisting of the first and second coil is wound multiple times so as not to be overlapped, including a wiring from the group consisting of said first and second routing wiring, in a region where a memory array from the group consisting of said first and second memory array exists.

7. An electronic circuit comprising:

a first semiconductor substrate including a first memory array for storing information, and a first coil as an antenna formed by a metal wiring layer being overlapped with a region where the first memory array exists;

a second semiconductor substrate including a second memory array for storing information, and a second coil as an antenna formed by a metal wiring layer being overlapped with a region where the second memory array exists, wherein:

the coil from the group consisting of said first and second coil has a polygonal shape, each side of which is disposed so as not to be parallel to a line from the group consisting of the bit line and word line of said memory array from the group consisting of the first and second memory array, and the first semiconductor substrate and the second semiconductor substrate are stacked and mounted so that a region, on the first semiconductor substrate, where the first coil exists and a region, on the second semiconductor substrate, where the second coil exists are overlapped and the first and second coils carry out wireless communications with each other.

8. The electronic circuit according to claim 7 further comprising:

a transmitter connected to said coil from the group consisting of the first and second coil;

a potential holding circuit that attempts to hold the coil from the group consisting of the first and second coil at a predetermined potential; and a coil driver circuit that drives the coil from the group consisting of the first and second coil in accordance with transmission data while holding a potential in a center of the coil from the group consisting of the first and second coil at the predetermined potential;

wherein the first semiconductor substrate and the second semiconductor substrate are stacked and mounted so that a region, on the first semiconductor substrate, where the first coil exists and a region, on the second semiconductor substrate, where the second coil exists are overlapped and the first and second coils carry out wireless communications with each other.

9. An electronic circuit comprising:

a first semiconductor substrate including a memory array for storing information and a first coil as an antenna formed by a metal wiring layer being overlapped with a region where the memory array exists;

a third semiconductor substrate including a third coil as an antenna formed by a metal wiring layer being overlapped with a region where said first coil exists, wherein:

a transmitter connected to said first coil and disposed outside a region where said memory array exists; and a routing wiring connecting said first coil and said transmitter and disposed so as not to be parallel to the line from the group consisting of the bit line and word line of said memory array.

10. An electronic circuit comprising:

a first semiconductor substrate including a memory array for storing information and a first coil as an antenna formed by a metal wiring layer being overlapped with a region where the memory array exists;

a third semiconductor substrate including a third coil as an antenna formed by a metal wiring layer being overlapped with a region where said first coil exists, wherein the first coil is wound multiple times so as not to be overlapped, including said routing wiring, in a region where said memory array exists.

11. An electronic circuit comprising:

a first semiconductor substrate including a memory array for storing information and a first coil as an antenna formed by a metal wiring layer being overlapped with a region where the memory array exists;

a third semiconductor substrate including a third coil as an antenna formed by a metal wiring layer being overlapped with a region where said first coil exists, wherein said coil from the group consisting of the first and third coil has a polygonal shape, each side of which is disposed so as not to be parallel to the line from the group consisting of the bit line and word line of said memory array.

12. An electronic circuit comprising:

a first semiconductor substrate including a memory array for storing information and a first coil as an antenna formed by a metal wiring layer being overlapped with a region where the memory array exists;

a third semiconductor substrate including a third coil as an antenna formed by a metal wiring layer being overlapped with a region where said first coil exists;

a transmitter connected to said the coil from the group consisting of first and third coil;

a potential holding circuit that attempts to hold the coil from the group consisting of the first and third coil at a predetermined potential; and a coil driver circuit that drives the coil from the group consisting of the first and third coil in accordance with transmission data while holding a potential in a center of the coil from the group consisting of the first and third coil at the predetermined potential.

* * * * *